United States Patent
Martell et al.

(10) Patent No.: US 6,540,947 B2
(45) Date of Patent: Apr. 1, 2003

(54) BI-CHROMAL BALL PRODUCTION APPARATUS AND METHOD

(75) Inventors: Dennis Martell, Flowermound, TX (US); Nicholas K. Sheridan, Palo Alto, CA (US); Joseph M. Crowley, Morgan Hill, CA (US); Matthew E. Howard, Cambridge, MA (US); Michelle Anne Remus, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 221 days.

(21) Appl. No.: 09/749,573

(22) Filed: Dec. 28, 2000

(65) Prior Publication Data
US 2002/0084877 A1 Jul. 4, 2002

(51) Int. Cl.⁷ .............................. B29B 9/10
(52) U.S. Cl. .............................. 264/8; 425/8
(58) Field of Search .................... 264/8; 425/8

(56) References Cited
U.S. PATENT DOCUMENTS

| | | | |
|---|---|---|---|
| 5,262,098 A | | 11/1993 | Crowley et al. |
| 5,344,594 A | | 9/1994 | Sheridan |
| 5,919,409 A | * | 7/1999 | Sheridon .................. 264/5 |
| 5,976,428 A | * | 11/1999 | Richley .................. 264/10 |
| 5,989,629 A | * | 11/1999 | Sacripante et al. ......... 427/180 |
| 6,097,531 A | * | 8/2000 | Sheridon .................. 264/15 |
| 6,174,153 B1 | * | 1/2001 | Sheridon .................. 264/8 |

* cited by examiner

Primary Examiner—Mary Lynn Theisen
(74) Attorney, Agent, or Firm—Oliff & Berridge, PLC.

(57) ABSTRACT

A bi-chromal ball production apparatus and method where the bi-chromal ball material is fed from opposite sides of the disk, reconfiguring the internal geometry of the apparatus, and precisely configuring the bi-chromal ball material feeding slit. The bi-chromal ball production apparatus has a disk that rotates, a first supply structure that supplies a first bi-chromal ball material to the disk from a first direction, a second supply structure tube that supplies a second bi-chromal ball material to the disk from a second direction and a motor that rotates the disk. The bi-chromal ball production apparatus includes a first reservoir and a first slit defined by the disk and a top body, a second reservoir and a second slit defined by the disk and a bottom body. An inner surface of each of the first and second reservoir is parabola shaped.

28 Claims, 5 Drawing Sheets

BI-CHROMAL BALL PRODUCTION APPARATUS AND METHOD

BACKGROUND OF THE INVENTION

1. Field of Invention

This invention relates to producing bi-chromal balls for use in electric paper.

2. Description of Related Art

First and second color bi-chromal ball material with different electric and/or magnetic properties can be combined to form bi-chromal balls. FIG. 1 shows an exemplary bi-chromal ball 100 formed using a first color bi-chromal ball material 10 and a second color bi-chromal ball material 20. The exemplary bi-chromal ball 100 has a magnetic or electric dipole oriented top to bottom. Thus, the bi-chromal ball 100 shown in FIG. 1 will rotate when subjected to various magnetic or electric fields. The bi-chromal ball 100 can be produced using various admixtures and materials as known in the art.

The bi-chromal ball 100 can be used in electric paper. In electric paper, many bi-chromal balls are placed next to each other in a matrix to form a sheet. The bi-chromal balls can be rotated to form letters and pictures by alternating the showing of either the first color or second color sides.

As shown in FIG. 2, the bi-chromal balls 100 are conventionally formed using a known spinner 1000. The spinner 1000 has a bi-chromal ball material feeding portion 1220 and a spinning portion 1180. The bi-chromal ball material is fed in through material supply tubes 1110 and 1140 to a pair of reservoir portions 1130 and 1170. The bi-chromal balls 1190 are spun off of a disk 1200 of the spinning portion 1180. The bi-chromal ball material feeding portion 1220 does not spin and includes the material supply tubes 1110 and 1140 and one or more O-rings 1210. The O-rings 1210 are used to seal the ends of at least one of the material supply tubes 1110 and 1140.

The spinning portion 1180 includes first and second bi-chromal ball material transport portions 1120 and 1150 and a pair of bi-chromal ball material reservoirs 1130 and 1170. A first color bi-chromal ball material is fed through the material supply tube 1110, into the second bi-chromal ball material transport portion 1150, and flows through a third bi-chromal ball material transport portion 1160 into the bi-chromal ball material reservoir 1170. A second color bi-chromal ball material is fed through the material supply tube 1140, flows through the first bi-chromal ball material transport portion 1120 and into the bi-chromal ball material reservoir 1130. The bi-chromal ball material is then forced outward from the bi-chromal ball material reservoirs 1130 and 1170 by the pressure in the material supply tubes 1110 and 1140 and by the centrifugal force of the spinning disk 1200 and flows along the surfaces of the disk 1200 until it forms the bi-chromal balls 1190. The speed at which the bi-chromal ball material is fed to the disk 1200 to create the bi-chromal balls 1190 is controlled by the amount of pressure exerted on the bi-chromal ball material in the bi-chromal ball material supply tubes 1110 and 1140.

Inside of the spinning portion 1180, one color bi-chromal ball material is kept from the other color bi-chromal ball material in the bi-chromal ball material transport portions 1120 and 1150 by the one or more O-rings 1210, 1211, 1212 and 1213. The one or more O-rings 1210 form a seal between the non-spinning bi-chromal ball material feed portion 1220 and the spinning portion 1180, while the other O-rings are static and do not seal rotating parts.

U.S. Pat. Nos. 5,262,098 and 5,344,594, each incorporated herein by reference in its entirety, teach various methods for using liquids fed on opposite sides of a spinner to spread liquids.

SUMMARY OF THE INVENTION

This invention provides a bi-chromal ball production apparatus and method that is simpler to operate.

This invention separately provides a bi-chromal ball production apparatus and method that can operate at higher speeds.

This invention separately provides a bi-chromal ball production apparatus and method that has a greater control over the speed of the spinner.

This invention separately provides a bi-chromal ball production apparatus and method that has a higher yield of bi-chromal balls produced.

One or more of these various features and advantages of the invention are realized by feeding the bi-chromal ball material from opposite sides of the disk, reconfiguring the internal geometry of the apparatus and of controllably configuring the bi-chromal ball material feeding slit.

In various exemplary embodiments of the bi-chromal ball production apparatus according to this invention, the bi-chromal ball production apparatus has a disk that rotates, a first material supply tube that supplies a first bi-chromal ball material to a first side of the disk from a first direction, a second material supply tube that supplies a second bi-chromal ball material to a second side of the disk from a second direction, and a motor that rotates the disk. The bi-chromal ball production apparatus may include a first slit defined by the disk and a first housing and/or a second slit defined by the disk and a second housing. In various exemplary embodiments, the first and second slits each have a length of about 0.045 inches, a height of about 0.0025 inches and end at a distance of 0.775 inches from the center of rotation.

In various exemplary embodiments the apparatus may include a first reservoir portion defined by the disk, the first housing, the first slit and the first feed tube and a second reservoir portion defined by the disk, the second housing, the second slit and the second feed tube. In various exemplary embodiments, the disk may rotate at a speed of about 1800 revolutions per minute to about 5600 revolutions per minute.

These and other features and advantages of this invention are described in or are apparent from the following detailed description and drawings of the exemplary embodiments.

BRIEF DESCRIPTION OF THE DRAWINGS

Various exemplary embodiments of the invention is described as referenced to the following figures, wherein like numerals identify like elements and wherein.

DETAILED DESCRIPTION OF PREFERRED EMBODIMENTS

Figure 3:
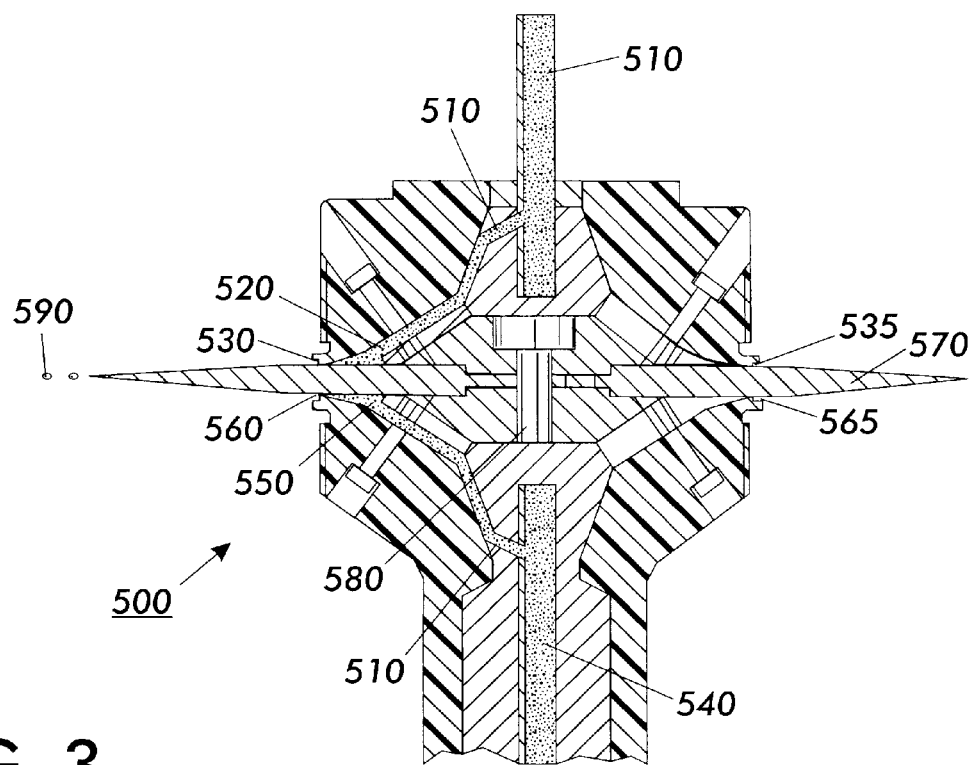
FIG. 3 is a cross-sectional view of a first exemplary embodiment of a bi-chromal ball production apparatus according to this invention.

FIG. 3 shows a first exemplary embodiment of a bi-chromal ball production apparatus 500 according to this invention. As shown in FIG. 3, the bi-chromal ball production apparatus 500 includes a spinner 570, a rotor 580, one or more bi-chromal material supply tubes 510 and 540, one or more bi-chromal ball material transport portions 520 and 550, one or more bi-chromal ball material reservoirs 530 and 560, and one or more bi-chromal ball material slits 535 and 565.

A first color bi-chromal ball material is fed through the first bi-chromal ball material supply tube 540 into a first bi-chromal ball material transport portion 520, and then into a first bi-chromal ball material reservoir 560. A second color bi-chromal ball material is fed through a second bi-chromal ball material supply tube 510 through a second bi-chromal ball material transport portion 580 and then into a second bi-chromal ball material reservoir 530. The bi-chromal ball material in each of the first and second bi-chromal ball material reservoirs 530 and 560 is then fed through first and second bi-chromal ball material slits 535 and 565, respectively, by centrifugal force along the spinner 570 and by the pressure in the supply tubes 510 and 540 to form the bi-chromal balls 590.

Figure 4:
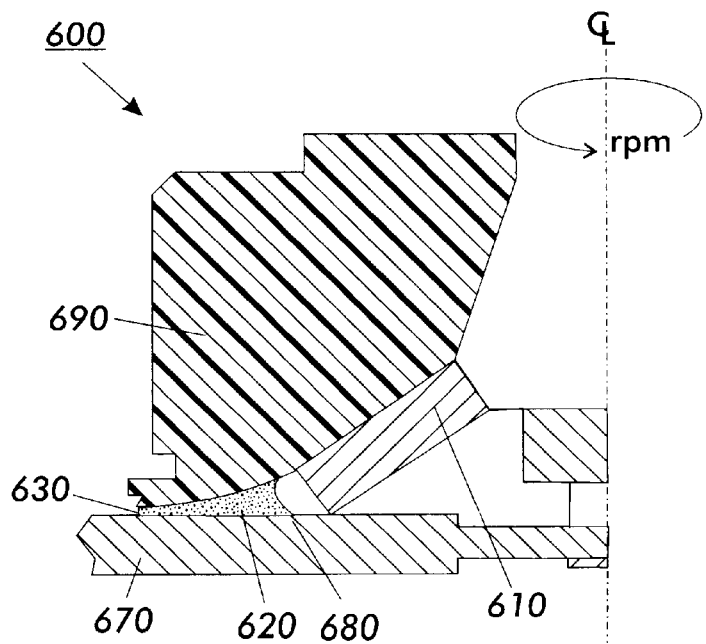
FIG. 4 is a cross-sectional view of the bi-chromal ball production apparatus of FIG. 3 showing one exemplary embodiment of a bi-chromal ball material reservoir in greater detail.

Thus, in the first exemplary embodiment of the bi-chromal ball production apparatus 500 according to this invention shown in FIGS. 3 and 4, no part of the bi-chromal ball material transport portions 510 and 540 is formed as part of, or even comes into contact with, the rotating spinner 570, eliminating the need to use the O-rings 1200 used in the conventional spinner 1000. The O-rings 1200 are disadvantageous in the conventional spinner 1000, since the O-rings 1200 introduce vibrations in the conventional spinner 1000 and thus limits its maximum rotating speed, and because the o-rings and the o-ring grooves are severely damaged by the abrasive nature of the pigmented bi-chromal ball material.

In addition, in various exemplary embodiments, the lack of contact between bi-chromal ball material transport portions 510 and 540 and the spinner 570 allows for centrifugal force to be the determining factor in the rate that bi-chromal ball material is supplied to the bi-chromal ball material slits 535 and 565. As explained below, the bi-chromal ball material slits 535 and 565 can restrict the flow of the bi-chromal ball material out of the bi-chromal ball material reservoirs 530 and 560, thus, depending on the rotational velocity of the spinner 570 and thus the resulting centrifugal force on the bi-chromal ball material in the bi-chromal ball material reservoirs 530 and 560, as well as the flow rate of bi-chromal ball material through the bi-chromal ball material transport portions 520 and 550 into the bi-chromal ball material reservoirs 530 and 560, the amount of bi-chromal ball material on the bi-chromal ball material reservoirs 530 and 560 remains within predetermined limits. Further, as explained below, the bi-chromal ball material reservoirs 530 and 560 can be used to smooth out irregularities in the flow of bi-chromal ball material through the bi-chromal ball material transport portions 520 and 550 and into the bi-chromal ball material reservoirs 530 and 560.

In various exemplary embodiments, the bi-chromal ball material transport portions 520 and 550 are designed to operate over a selected flow rate range. While operating within this flow rate range, a stable amount of bi-chromal ball material flows through bi-chromal ball transport portions 520 and 550 and into the bi-chromal ball material reservoirs 530 and 560. The bi-chromal ball transport portions 520 and 550 are thus able to deliver the bi-chromal ball material to the spinner 570 without needing to contact the spinner 570 or otherwise have any portion of either of the bi-chromal ball material transport portions 520 and 550 on any rotating element of the bi-chromal ball material production apparatus 500.

FIG. 4 is cross-sectional view showing one exemplary embodiment of a reservoir portion 600 of the first exemplary embodiment of a bi-chromal ball production apparatus 500 shown in FIG. 3 in greater detail. The reservoir portion 600 of the bi-chromal ball production apparatus 500 includes a bi-chromal ball material transport portion 610, a bi-chromal ball material reservoir 620, a slit 630 formed on the side of a portion 670 of the spinner 570, and a portion 690 of a housing used to form the bi-chromal ball material reservoir 620 and the bi-chromal ball material slit 630.

As the bi-chromal ball material is fed down the bi-chromal ball material transport portion 610 at the selected flow rate, the bi-chromal ball material will gather in the bi-chromal ball material reservoir 620. The centrifugal pressure that is built up in the bi-chromal ball material in the bi-chromal ball material reservoir 620 by the rotational velocity of the spinner 570 forces the bi-chromal ball material out of the bi-chromal ball material reservoir 620, through the slit 630 and along the portion 670 of the spinner 570. As outlined above, for any given dimensions for the bi-chromal ball material slit 630, the rotational speed of the portion 670 of the of the spinner 570 controls the rate at which the bi-chromal ball material flows out of the bi-chromal ball material reservoir 620, and thus the size, quality and the quantity of the bi-chromal balls 590 produced by the bi-chromal ball material product apparatus 500.

The bi-chromal ball material slit 630 is subjected to atmospheric pressure on both the upstream (i.e., towards the bi-chromal ball material transport portion 610) side and the downstream (i.e., toward the edge of the spinner 570) side of the bi-chromal ball material slit 630. Therefore, in the bi-chromal ball production apparatus 500, the bi-chromal ball material is only subjected to centrifugal pressure generated by the rotational velocity of the spinner 570. Once the bi-chromal ball material in the bi-chromal ball material reservoir is in contact with the surface of the portion 670 of the spinner 570, the bi-chromal ball material is accelerated radially out of the bi-chromal ball material reservoir 620 towards the bi-chromal ball material slit 630.

Due to the high flow restriction generated by the bi-chromal ball material slit 620, where the flow resistance created by the bi-chromal ball material slit 630 is a function of the slit length and the gap slit, the bi-chromal ball material starts to build up in the bi-chromal ball material reservoir 620, creating a constantly-moving free surface position 680, until equilibrium is met between the pressure drop across the bi-chromal ball material slit 630 due to the flow resistance and the increasing pressure due to centrifugal force applied on the bi-chromal ball material due to increasing amounts of the bi-chromal ball material, in the bi-chromal ball material reservoir 620. Once equilibrium is achieved, the bi-chromal ball material will flow out of the bi-chromal ball material reservoir 620 through the bi-chromal ball material slit 630 at a constant flow rate equal to the amount of bi-chromal ball material being delivered, i.e., the selected input flow rate of the bi-chromal ball material from the bi-chromal material transport portion 610 to the bi-chromal ball material reservoir 620.

This remains the case as long as the incoming flow rate is within the selected flow rate range. The bi-chromal ball material free surface 680 is constantly moving inside the bi-chromal ball material reservoir 620, along the radial direction, in order to achieve equilibrium between the bi-chromal ball material flowing out of the bi-chromal ball material reservoir 620 through the bi-chromal ball material slit 630 and the bi-chromal ball material entering the bi-chromal ball material reservoir 620 from the bi-chromal ball material transport portion 610. In other words, a change to either the rotational velocity of the spinner 570 and/or flow rate of the incoming bi-chromal ball material from the bi-chromal ball material transport portion 610 will upset the system equilibrium, making the bi-chromal ball material free surface 680 move until a new equilibrium is met.

Outside of the normal range of operation, two failure modes could occur. First, if there is too much bi-chromal ball material being fed to the bi-chromal ball material reservoir 620 from the bi-chromal ball material transport portion 610, and the system cannot find a new free surface position 680, the bi-chromal ball material can over-fill the bi-chromal ball material reservoir 620. As a result, a choked condition would occur.

The other possible failure mode occurs when the bi-chromal ball material transport portion 610 fails to supply enough bi-chromal ball material to the bi-chromal ball material reservoir 620. This starves the bi-chromal ball production apparatus 600 such that the bi-chromal ball material reservoir 620 empties. In this condition, the free surface 680 inside the bi-chromal ball material reservoir 620 is never achieved. As a result, the bi-chromal ball material is not distributed evenly onto the surface of the spinner 670 through the bi-chromal ball material slit 630, leading to poorly formed bi-chromal balls 590.

In summary, the slit length and height gap of the bi-chromal ball material slit 630 formed between the housing 690 of the bi-chromal ball production apparatus 600 and the spinner 670 is a design parameter which can be specifically designed for a desired operating range. The flow resistance at the bi-chromal ball material slit thus creates in various exemplary embodiments, a reservoir effect.

As shown in FIG. 4, in various exemplary embodiments, the housing 690 has a curved in surface that forms one surface of the bi-chromal ball material reservoir 620. As a result, once in the bi-chromal ball material reservoir 620 of the bi-chromal ball material apparatus 500, the bi-chromal ball material may flow through the bi-chromal ball material reservoir 620 using a curved interior geometry. The interior geometry of the bi-chromal ball material reservoir 620 can be adjusted and/or selected or designed to achieve a desired flow rate of the bi-chromal ball material out of the bi-chromal ball material reservoir 620 and through the bi-chromal ball material slit 630. In various exemplary embodiments, the curved interior geometry of the bi-chromal ball material reservoir 620 is parabolic. When used, the parabolic liquid flow path provides two advantages. First, the parabolic liquid flow path tends to accelerate the bi-chromal ball material out of the bi-chromal ball material reservoir 620 towards the bi-chromal ball material slit 630. Second, the parabolic liquid flow path tends to eliminate the sharp corners against which bi-chromal ball material could build up to clog the bi-chromal ball material reservoir 620.

In various exemplary embodiments according to this invention, the curved bi-chromal ball material flow path of the bi-chromal ball production apparatus 500 is straightforward compared to the more complex flow paths used in the conventional spinner 1000. In these exemplary embodiments, the curved flow path reduces the opportunity for the bi-chromal ball material to become clogged in any of the bi-chromal ball material transport portion or reservoir 610 or 620 or the bi-chromal ball material slit 630, such as around the bend in the bi-chromal ball material transport portion 1210 that is present in the conventional spinner 1000.

The bi-chromal ball reservoir 620 is, in various exemplary embodiments, parabola shaped. A parabola shape has been found to improve feeding the bi-chromal ball material from the bi-chromal ball material reservoir 620 to the spinner 570. However, other shapes for the inner surface of the housing 690, such as surfaces with angles and/or with more or less curvature, are also possible without departing from the spirit or scope of the invention.

Figure 5:
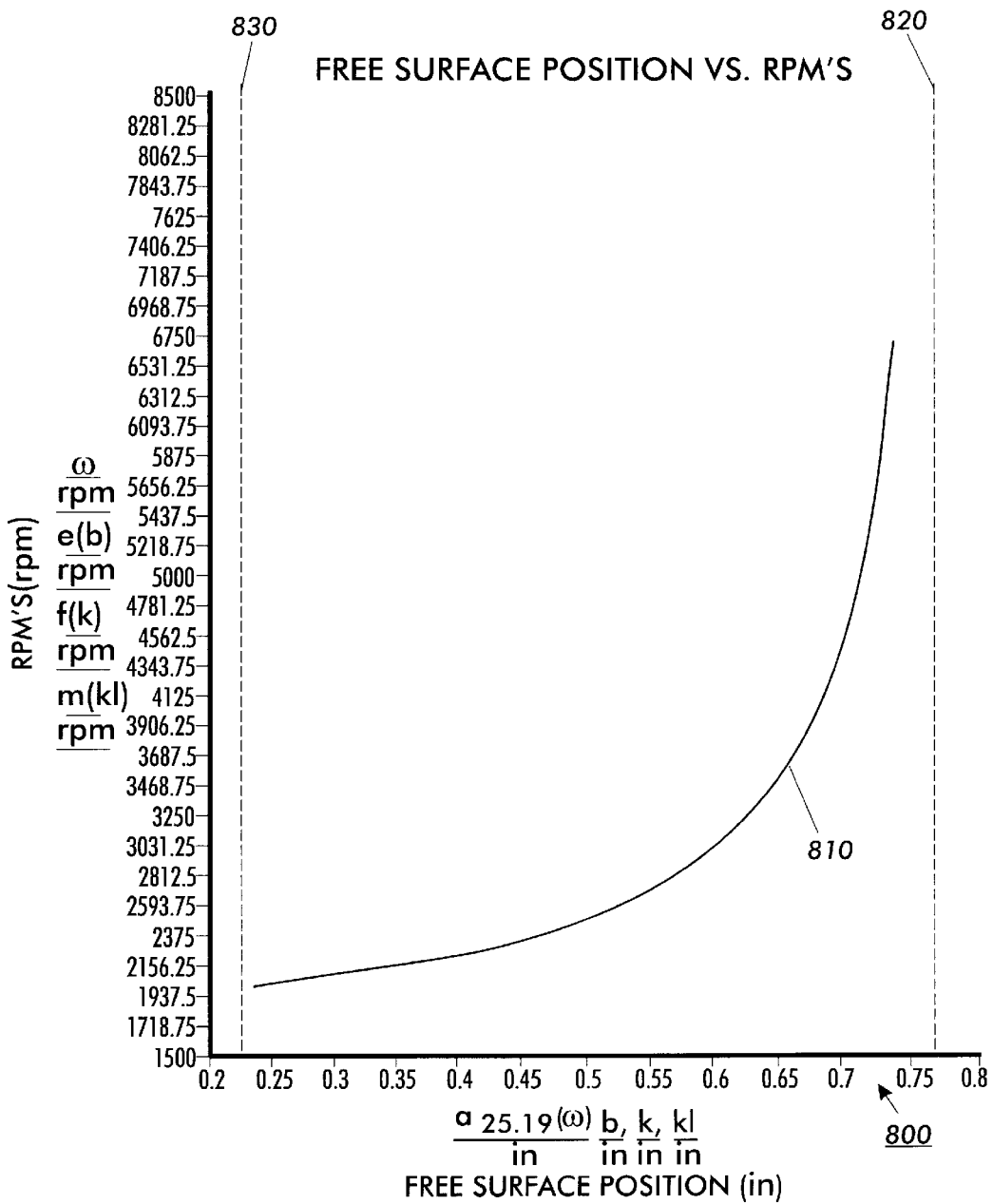
FIG. 5 is a graph of the free surface position within the bi-chromal ball production apparatus according to this invention against revolutions per minute.

In one exemplary embodiment, a slit length of 0.045 inches, a slit gap of 0.0025 inches and a distance from the center of rotation to the circumferential end of the bi-chromal ball material slit 630 of 0.775 inches produces the plot of the free surface position 680 against the rotational speed of the spinner 670 shown in FIG. 5.

Thus, FIG. 5 shows a graph 800 of the free surface position 680 from the center axis versus the rotational velocity, in revolutions per minute, for the exemplary embodiment of the portion 600 of the bi-chromal ball production apparatus 500 shown in FIG. 4. For a flow rate of 0.75 cc/second of the bi-chromal ball material through the bi-chromal ball material transport portion 610 into the bi-chromal ball material reservoir 620, the free surface 680 in this exemplary bi-chromal ball production apparatus is described by the curve 810. As shown in FIG. 5, when the rotational velocity is varied between around 2000 rpm and around 6700 rpm, the free surface 680 remains radially inside of the axial end of the bi-chromal ball material reservoir 620, which is indicated by the line 830, such that the bi-chromal ball material reservoir 620 does not become over filled and thus does not overflow. Similarly, the free surface 680 also remains radially outside of the circumferential end of the bi-chromal ball material reservoir 620, indicated by the line 820 such that the bi-chromal ball material reservoir does not empty. Thus, when the rotational velocity of the spinner 620 is varied between around 2000 rpm to around 6700 rpm, the bi-chromal ball material will flow to the edge of the spinner 570 at a flow rate, in volume per radians, determined primarily, if not solely, by the rotational velocity of the spinner 570.

Other free surface position curves are possible, depending on the speed of the spinner 570, the flow rate of bi-chromal ball material into the bi-chromal ball material reservoir 620 and the size of the bi-chromal ball material slit 630. In various exemplary embodiments, any or all of these parameters can be varied without departing form the spirit and scope of the invention.

Thus, in various exemplary embodiments of the bi-chromal ball production apparatus according to this invention, the bi-chromal ball material flow rate to the surfaces of the spinner 570 is driven primarily by centrifugal pressure. By driving the bi-chromal ball material flow rate by centrifugal pressure, the bi-chromal ball material supply portions, such as the bi-chromal ball material transport portions 510 and 540, of the bi-chromal ball material production apparatus 500 can be isolated from the spinning portions of the bi-chromal ball material production apparatus 500, such as the bi-chromal ball material transport portions 510 and 540. This tends to eliminate the need for any physical contact between the bi-chromal ball material supply portions of the bi-chromal ball material production apparatus 500 and the spinning portions of the bi-chromal ball material production apparatus.

Figure 1:
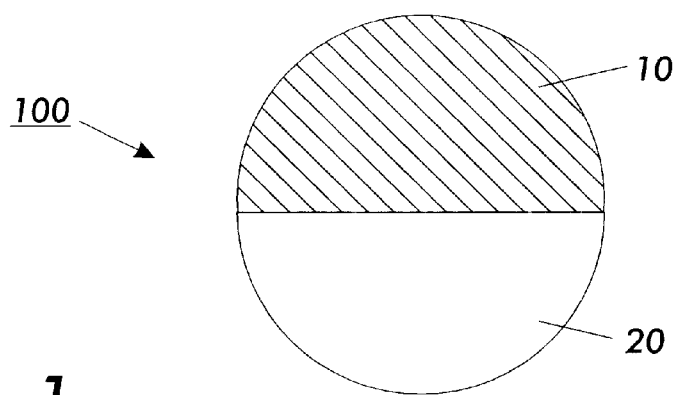
FIG. 1 illustrates a bi-chromal ball.
Figure 2:
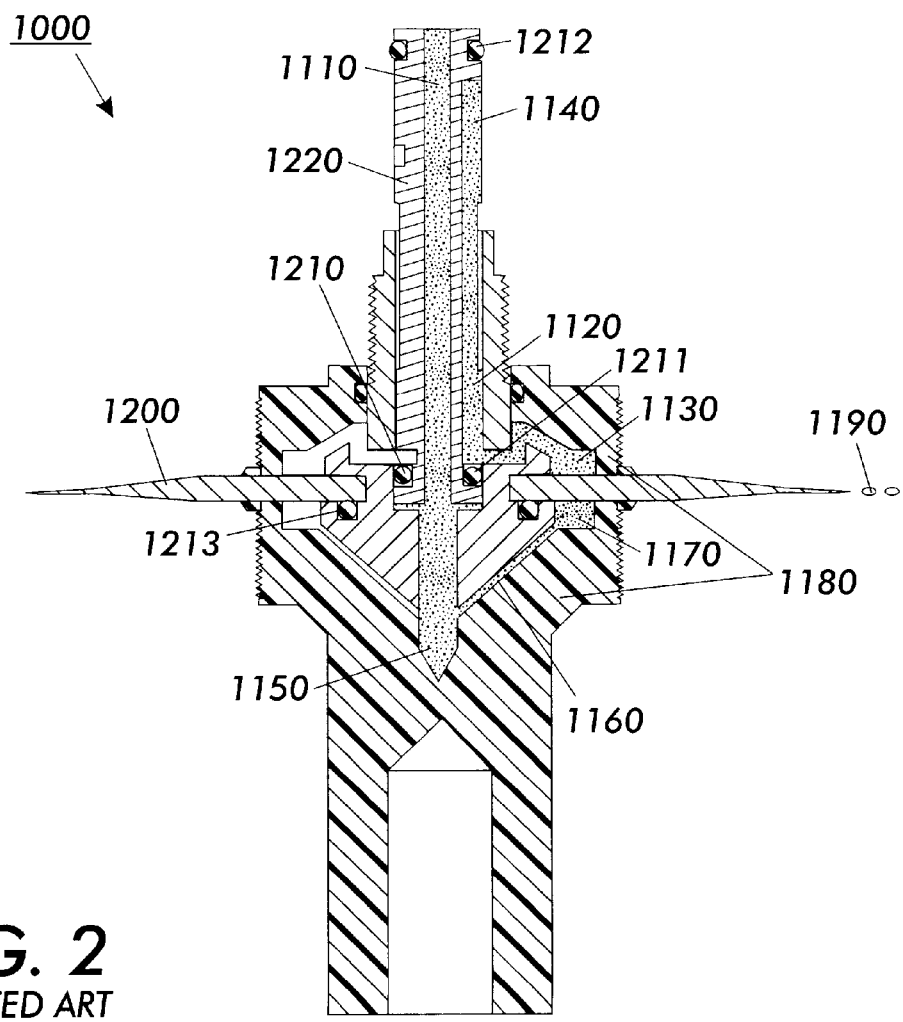
FIG. 2 is an exemplary cross-sectional view of a conventional spinner.

In contrast, in the conventional pressurized feeding system shown in FIGS. 1 and 2, that bi-chromal ball producing apparatus 1000 will not work without physical contact between these portions. Also, the internal geometry of the bi-chromal ball production apparatus according to this invention is robust enough to allow for minor variations in rotational velocity without adversely affecting the performance of the bi-chromal ball production apparatus 500. In other words, bi-chromal ball material reservoir 520, 550 and/or 620 continuously self-adjust the volume of the bi-chromal ball material so that small variations in the rotational velocity of the spinner 570 do not adversely affect the flow rate of the bi-chromal ball material to the spinner 570. Also, if the volume of the bi-chromal ball material reservoir 520, 550 and/or 620 is large enough, any variations in the flow rate due to inconsistencies in the amount of bi-chromal ball material supplied by the bi-chromal ball material transport portion 510, 540 and/or 610 will be averaged over time, reducing the magnitude of the flow rate variations, i.e., smoothing out those variations that pass to the spinner 570.

Figure 6:
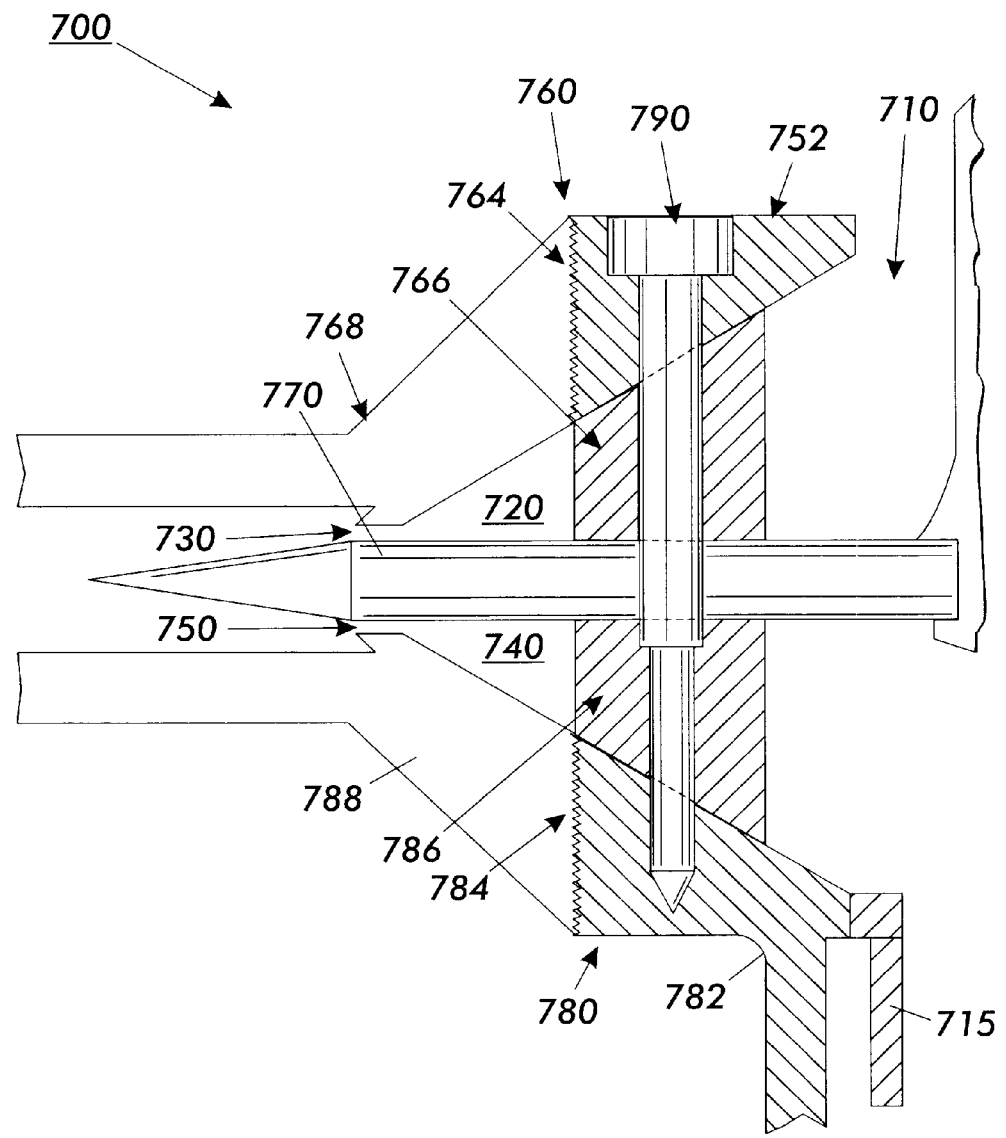
FIG. 6 is a cross-sectional view of a second exemplary embodiment of a bi-chromal ball production apparatus according to this invention.

FIG. 6 shows a second exemplary embodiment of a bi-chromal ball production apparatus 700 according to this invention. The bi-chromal ball production apparatus 700 includes a bi-chromal ball material supply portion 710, a number of bi-chromal material reservoirs 720 and 740, a number of bi-chromal ball material slits 730 and 750, a first housing 760 a second housing 780 and a screw 790. The slit 730 is defined by the spinner 770 and a first outer housing 768 of the first housing 760. Likewise, the slit 750 is defined by the spinner 770 and a second outer housing 788 of the second housing 780. The bi-chromal material reservoir 720 is formed by an inner housing 762 and the outer housing 768 of the first housing 760 and the spinner 770. Likewise, the bi-chromal material reservoir 740 is formed by an inner housing 782 and the outer housing 788 of the second housing 780 and the spinner 770. Each of the outer housings 768 and 788 have threads 764 and 784, respectively, that mesh with threads 764 and 784 formed on the inner housings 762 and 782, respectively.

Figure 7:
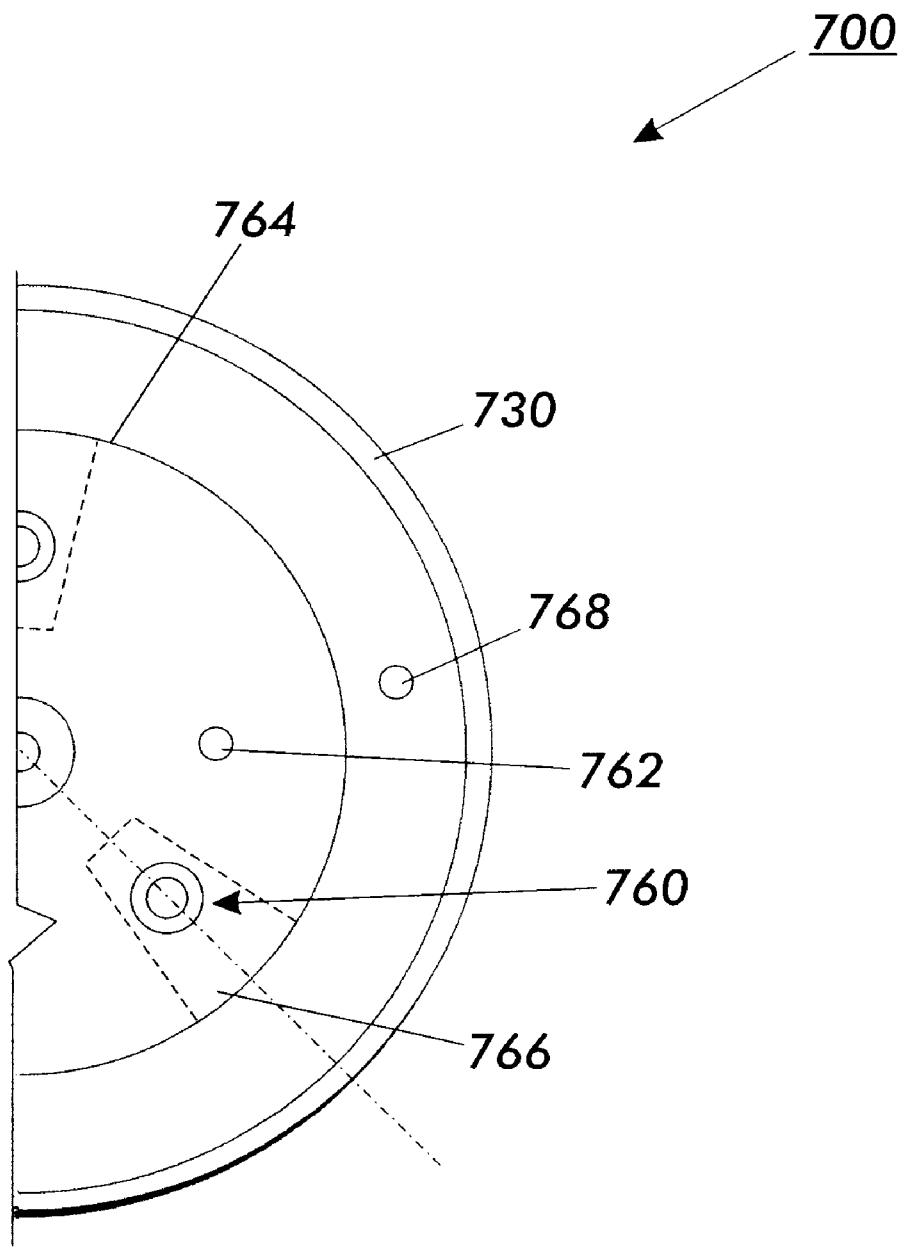
FIG. 7 is a top view of a portion of the bi-chromal ball producing apparatus of FIG. 6.

As shown in FIG. 7, the inner housings 762 and 782 are supported by webs or columns 766 and 786 distributed around the circumference of the circular inner housings 762 and 782. The screw 790 passes through the inner housing 762, a pair of the columns 766 and 786, the spinner 770 and into the inner housing 782.

The slit 730 can be adjusted by turning the outer housing 768 relative to the upper housing 762. Likewise, the slit 750 can be adjusted by turning the outer housing 788 relative to the inner housing 782.

As noted above, the free surface position of the bi-chromal ball material inside the bi-chromal material reservoirs 720 and 740 is controlled by the flow resistance provided by the bi-chromal ball material slits 730 and 750, respectively, and varies with the fluid properties of the bi-chromal ball material, the rotational velocity of the disc 770 and the amount of bi-chromal ball material being fed through the bi-chrome ball material supply portions 710 and 715. Therefore, any change in the material properties or rotational velocity might cause a failure mode within the bi-chromal ball producing apparatus 500 or 700 according to this invention. However, in this second exemplary embodiment of the bi-chromal ball material production apparatus 700, the bi-chromal ball material slit 730 can be adjusted by rotating the outer housing 768 relative to the inner housing 762 to move the outer housing 768 up or down to increase or decease the vertical size of the bi-chromal ball material slit 730 of the bi-chromal ball material production apparatus 700.

This can be done independently of any adjustments to the bi-chromal ball material slit 750. The bi-chromal ball material slit is itself adjusted by rotating the outer housing 788 relative to the inner housing 782 such that outer housing 788 moves up or down to make the vertical size of the bi-chromal ball material slit 750 larger or smaller. Thus, in the second exemplary embodiment of the bi-chromal ball material production apparatus 700 shown in FIGS. 6 and 7, the bi-chromal ball material slits 730 and 750 can be adjusted independently of each other, allowing for bi-chromal ball materials with different viscosities and reducing the likelihood that the bi-chromal ball material reservoirs 720 and/or 740 overflow or become clogged by undispensed bi-chromal ball material or large fibers within the bi-chromal ball material.

The second exemplary embodiment of the bi-chromal ball material production apparatus shown in FIGS. 6 and 7 can use the same type of thread system used in micrometers for the threads formed in the inner and outer housings 762, 768, 782 and 788. The second exemplary embodiment of the bi-chromal ball material production apparatus can use a two-piece structure for each of the top and the bottom housings 760 and 780. One part forms the majority of the internal geometry of the inner housings 762 and 782. In this case, the inner housings 762 or 782 would be permanently mounted to the spinner 770 with the series of mounts 766, 786 and bolts 790. The outer housings 768 and 788 can be attached to the inner housing 762 and 782 by the threads 764 or 786 on each housing 762, 768, 782 and 788. By rotating the outer housing 768 or 788 relative to the inner housings 762 or 782, the bi-chromal ball material slit 730 or 750, respectfully, is opened or closed, depending on which direction the outer housing 768 or 788 was rotated relative to the inner housing 762 or 782. In the second exemplary embodiment of the bi-chromal ball material production apparatus, calibration marks could be used on the inner housings 762 and 782 and a reference point on the outer housings 768 and 788 to indicate the slit size of the bi-chromal ball material slits 730 and 750.

In various exemplary embodiments, the inner housings 762 and 782 and the outer housings 768 and 788 are machined out of heat-stable material because of the high temperatures encountered in operations. However, other materials may be used.

This second exemplary embodiment of the bi-chromal ball material production apparatus has been shown with the threads 764 and 784 formed on the interface between the inner housings 762 and 782 and the outer housings 768 and 788. However, it should be appreciated that the adjustment threads can be placed in other areas in other exemplary embodiments.

While the adjustment mechanism in the second exemplary embodiment of the bi-chromal ball material production apparatus shown in FIGS. 6 and 7 uses threads 764 and 784 formed on the inner and outer housings 762 and 768, and 782 and 788, respectively, any other known or later developed devices, structures or apparatus usable to adjust the size of the bi-chromal ball material slits 730 and 750 can be used.

While this invention has been described in conjunction with specific embodiments thereof, it is evident that many alternatives, modifications, and variations will be apparent to those skilled in the art. For example, the bi-chromal ball material has been described as bi-chromal ball material of two different colors, and bi-chromal ball material of similar color but different properties may be substituted. Accordingly, preferred embodiments of the invention as set forth herein are intended to be illustrative, not limiting. Various changes may be made without departing from the spirit and scope of the invention.

What is claimed is:

1. An apparatus for producing bi-chromal balls, comprising:
   a disk that rotates;
   a first material supply structure that supplies a first bi-chromal ball material to a first side of the disk;
   a second material supply structure that supplies a second bi-chromal ball material to a second side of the disk from a second direction;
   a motor that rotates the disk;
   a first body;
   a second body;
   a first slit defined by the disk and the first body; and
   a second slit defined by the disk and the second body,
   wherein the first material supply structure is located on the first side of the disk and the second material supply structure is located on the second side of the disk.

2. The apparatus of claim 1, wherein the first and second slits have a length of about 0.045 inches, a height of about 0.0025 inches and each such slit has a circumferential end located at a distance of 0.775 inches from the center of rotation.

3. The apparatus of claim 1, further comprising:
   a first reservoir defined first by the disk and the first body, the first material supply structure supplying the first bi-chromal ball material to the first reservoir, the first bi-chromal ball material flowing out of the first reservoir through the first slit solely under centrifugal pressure provided by the disk when it rotates; and
   a second reservoir defined first by the disk and the second body, the second material supply structure supplying the second bi-chromal ball material to the second reservoir, the second bi-chromal ball material flowing out of the second reservoir through the second slit solely under centrifugal pressure provided by the disk when it rotates.

4. The apparatus of claim 3, wherein each of the first reservoir and the second reservoir have a parabolic shaped flow surface.

5. The apparatus of claim 1, wherein at least one of the first and second slits are adjustable.

6. The apparatus of claim 5, further comprising, at least one screw for adjusting at least one of the first and second slit.

7. An apparatus for producing bi-chromal balls, comprising:
   a disk that rotates;
   a first material supply structure that supplies a first bi-chromal ball material to a first side of the disk;
   a second material supply structure that supplies a second bi-chromal ball material to a second side of the disk from a second direction; and
   a motor that rotates the disk;
   a first body;
   a second body.
   a first slit defined by the disk and the first body;
   a second slit defined by the disk and the second body;
   a first reservoir defined first by the disk and the first body, the first material supply structure supplying the bi-chromal ball material to the first reservoir, the first bi-chromal ball material flowing out of the first reservoir through the first slit solely under centrifugal pressure provided by the disk when it rotates; and
   a second reservoir defined first by the disk and the second body, the second material supply structure supplying the bi-chromal ball material to the second reservoir, the second bi-chromal ball material flowing out of the second reservoir through the second slit solely under centrifugal pressure provided by the disk when it rotates.

8. The apparatus of claim 7, wherein the first material supply structure is located on the first side of the disk and the second material supply structure is located on the second side of the disk.

9. The apparatus of claim 8, wherein the slit has a length of about 0.045 inches, a height of about 0.0025 inches and the slit ends at a distance of 0.775 inches from the center of rotation.

10. The apparatus of claim 7, wherein each of the first reservoir and the second reservoir has a parabolic-shaped flow surface.

11. The apparatus of claim 7, wherein at least one of the first and second slits is adjustable.

12. The apparatus of claim 7, further comprising, at least one screw for adjusting at least one of the first and second slits.

13. A method of producing bi-chromal balls comprising:
   supplying a first bi-chromal ball material to a rotating disk from a first direction; and
   supplying a second bi-chromal ball material to a rotating disk from a second direction opposite the first direction,
   wherein supplying the first bi-chromal ball material comprises:
     supplying the first bi-chromal ball material to a first reservoir; and
     supplying the first bi-chromal ball material from the first reservoir to the rotating disk solely under centrifugal pressure provided by the rotating disk.

14. The method of claim 13, wherein:
   the first reservoir is formed by the rotating disk and a first housing having at least a first portion, an exit from the first reservoir being provided between the rotating disk and the first portion of the first housing; and
   supplying the first bi-chromal ball material comprises adjusting a flow rate of the first bi-chromal ball material through the exit by adjusting a distance of the first portion of the first housing relative to the rotating disk.

15. The method of claim 14, wherein:
   the first housing comprises the first portion and a second portion, the first portion rotatably mounted on the second portion; and
   adjusting the distance of the first portion of the first housing relative to the rotating disk comprises rotating the first portion relative to the second portion.

16. A method of producing bi-chromal balls comprising:
   supplying a first bi-chromal ball material to a rotating disk from a first direction; and supplying a second bi-chromal ball material to a rotating disk from a second direction opposite the first direction, wherein supplying the second bi-chromal ball material comprises:
  supplying the second bi-chromal ball material to a second reservoir; and
  supplying the second bi-chromal ball material from the second reservoir to the rotating disk solely under centrifugal pressure provided by the rotating disk.

17. The method of claim 16, wherein:

the second reservoir is formed by the rotating disk and a first housing having at least a first portion, an exit from the second reservoir being provided between the rotating disk and the first portion of the first housing; and supplying the second bi-chromal ball material comprises adjusting a flow rate of the second bi-chromal ball material through the exit by adjusting a distance of the first portion of the first housing relative to the rotating disk.

18. The method of claim 17, wherein:

the first housing comprises the first portion and a second portion, the first portion rotatably mounted on the second portion; and adjusting the distance of the first portion of the first housing relative to the rotating disk comprises rotating the first portion relative to the second portion.

19. A method of producing bi-chromal balls comprising:

supplying a first bi-chromal ball material to a first reservoir;

supplying the first bi-chromal ball material to a rotating disk from the first reservoir;

supplying a second bi-chromal ball material to a second reservoir; and supplying the second bi-chromal ball material to the rotating disk from the second reservoir, wherein supplying the first bi-chromal ball material comprises supplying the bi-chromal ball material from the first reservoir to the rotating disk solely under centrifugal pressure provided by the rotating disk.

20. The method of claim 19, wherein:

the first reservoir is formed by the rotating disk and a first housing having at least a first portion, an exit from the first reservoir being provided between the rotating disk and the first portion of the first housing; and supplying the first bi-chromal ball material comprises adjusting a flow rate of the first bi-chromal ball material through the exit by adjusting a distance of the first portion of the first housing relative to the rotating disk.

21. The method of claim 20, wherein:

the first housing comprises the first portion and a second portion, the first portion rotatably mounted on the second portion; and adjusting the distance of the first portion of the first housing relative to the rotating disk comprises rotating the first portion relative to the second portion.

22. A method of producing bi-chromal balls comprising:

supplying a first bi-chromal ball material to a first reservoir;

supplying the first bi-chromal ball material to a rotating disk from the first reservoir;

supplying a second bi-chromal ball material to a second reservoir; and supplying the second bi-chromal ball material to the rotating disk from the second reservoir, wherein supplying the second bi-chromal ball material comprises supplying the bi-chromal ball material from the second reservoir to the rotating disk solely under centrifugal pressure provided by the rotating disk.

23. The method of claim 22, wherein:

the second reservoir is formed by the rotating disk and a first housing having at least a first portion, an exit from the second reservoir being provided between the rotating disk and the first portion of the first housing; and supplying the second bi-chromal ball material comprises adjusting a flow rate of the second bi-chromal ball material through the exit by adjusting a distance of the first portion of the first housing relative to the rotating disk.

24. The method of claim 23, wherein:

the first housing comprises the first portion and a second portion, the first portion rotatably mounted on the second portion; and adjusting the distance of the first portion of the first housing relative to the rotating disk comprises rotating the first portion relative to the second portion.

25. A method of producing bi-chromal balls comprising:

supplying a first bi-chromal ball material to a first reservoir;

supplying the first bi-chromal ball material to a rotating disk from the first reservoir;

supplying a second bi-chromal ball material to a second reservoir; and supplying the second bi-chromal ball material to the rotating disk from the second reservoir, wherein:
  supplying the first bi-chromal ball material comprises supplying the bi-chromal ball material from the first reservoir to the rotating disk solely under centrifugal pressure provided by the rotating disk; and
  supplying the second bi-chromal ball material comprises supplying the bi-chromal ball material from the second reservoir to the rotating disk solely under centrifugal pressure provided by the rotating disk.

26. The method of claim 25, wherein:

the first reservoir is formed by the rotating disk and a first housing having at least a first portion, a first exit from the first reservoir being provided between the rotating disk and the first portion of the first housing;

the second reservoir is formed by the rotating disk and a second housing having at least a first portion, a second exit from the second reservoir being provided between the rotating disk and the first portion of the second housing;

supplying the first bi-chromal ball material comprises adjusting a flow rate of the first bi-chromal ball material through the first exit by adjusting a distance of the first portion of the first housing relative to the rotating disk; and supplying the second bi-chromal ball material comprises adjusting a flow rate of the second bi-chromal ball material through the second exit by adjusting a distance of the first portion of the second housing relative to the rotating disk.

27. The method of claim 26, wherein:

the first housing comprises the first portion and a second portion, the first portion rotatably mounted on the second portion;

the second housing comprises the first portion and a second portion, the first portion rotatably mounted on the second portion;

adjusting the distance of the first portion of the first housing relative to the rotating disk comprises rotating the first portion relative to the second portion; and adjusting the distance of the first portion of the second housing relative to the rotating disk comprises rotating the first portion relative to the second portion.

28. An apparatus for producing bi-chromal balls, comprising:

a disk that rotates;

a first material supply structure that supplies a first bi-chromal ball material to a first side of the disk;

a second material supply structure that supplies a second bi-chromal ball material to a second side of the disk from a second direction; and a motor that rotates the disk;

a first body;

a second body.

a first adjustable slit defined by the disk and the first body;

a second adjustable slit defined by the disk and the second body; and an adjuster for adjusting at least one of the first adjustable slit and the second adjustable slit.

* * * * *